United States Patent
Wilhelm

[11] Patent Number: 5,969,435
[45] Date of Patent: Oct. 19, 1999

[54] MODULAR DC COGENERATOR SYSTEMS

[75] Inventor: William George Wilhelm, Mastic, N.Y.

[73] Assignee: Nextek Power Systems, Inc., Ronkonkoma, N.Y.

[21] Appl. No.: 08/820,553

[22] Filed: Mar. 19, 1997

Related U.S. Application Data

[63] Continuation-in-part of application No. 08/606,219, Mar. 7, 1996, Pat. No. 5,786,642, which is a continuation-in-part of application No. 08/328,574, Oct. 24, 1994, Pat. No. 5,500,561, which is a continuation of application No. 08/129,375, Sep. 30, 1993, Pat. No. 5,363,333, which is a continuation of application No. 07/944,796, Sep. 14, 1992, abandoned, which is a continuation of application No. 07/638,637, Jan. 8, 1991, abandoned.

[51] Int. Cl.⁶ .......................................... H02J 9/06
[52] U.S. Cl. .............................. 307/64; 307/66; 307/68; 307/80; 307/85; 307/86
[58] Field of Search ...................... 307/43, 64, 66, 307/65, 80, 85, 86, 87

[56] References Cited

U.S. PATENT DOCUMENTS

| | | | |
|---|---|---|---|
| 2,194,822 | 3/1940 | Dannheiser | 171/97 |
| 4,206,608 | 6/1980 | Bell | 60/698 |
| 4,315,163 | 2/1982 | Bienville | 307/66 |
| 4,349,863 | 9/1982 | Petersen | 362/20 |
| 4,426,587 | 1/1984 | Nouet | 307/66 |
| 4,464,724 | 8/1984 | Gurr et al. | 364/492 |
| 4,508,996 | 4/1985 | Clegg et al. | 315/224 |
| 4,551,980 | 11/1985 | Bronicki | 60/698 |
| 4,630,005 | 12/1986 | Clegg et al. | 331/113 |
| 4,663,723 | 5/1987 | Umeda | 364/492 |
| 4,682,078 | 7/1987 | Pascalide | 315/86 |
| 4,731,547 | 3/1988 | Alenduff et al. | 307/85 |
| 4,742,291 | 5/1988 | Bobier et al. | 320/39 |
| 4,775,800 | 10/1988 | Wood | 307/46 |
| 4,821,166 | 4/1989 | Albach | 363/89 |
| 4,836,862 | 6/1989 | Pelka et al. | 136/253 |
| 4,860,185 | 8/1989 | Brewer | 363/41 |
| 4,894,764 | 1/1990 | Meyer et al. | 363/65 |
| 5,053,635 | 10/1991 | West | 307/67 |
| 5,089,937 | 2/1992 | Carrubba | 361/394 |
| 5,164,609 | 11/1992 | Poppe | 307/147 |
| 5,268,850 | 12/1993 | Skoglund | 364/480 |
| 5,289,048 | 2/1994 | Lavin et al. | 307/64 |
| 5,481,140 | 1/1996 | Maruyama et al. | 307/11 |
| 5,500,561 | 3/1996 | Wilhelm | 307/64 |
| 5,532,525 | 7/1996 | Kaiser | 307/64 |
| 5,772,793 | 6/1998 | Ashcroft et al. | 136/253 |

*Primary Examiner*—Albert W. Paladini
*Attorney, Agent, or Firm*—Alfred M. Walker

[57] ABSTRACT

A DC power system receives AC electrical power and DC electrical power from separate first and second sources simultaneously. The DC power system delivers DC electrical power to an output for use by a load requiring DC power. The DC power system includes a converter to convert AC electrical power to DC electrical power and a power sharing control device to control and distribute the DC electrical power to an output. The first source of DC electrical power includes a storage battery, which provides standby DC electrical power to the DC power system. It also includes a power sharing device, which maintains the storage battery fully charged for use at peak loads, when the DC output electrical power is insufficient to meet the DC load. The second source of DC electrical power is a cogenerator such as a fuel cell, a thermo photovoltaic generator or an internal combustion engine and an alternator for generating and delivering DC electrical power to the power sharing device, while producing and delivering waste heat for use of an external load requiring this heat.

14 Claims, 5 Drawing Sheets

MODULAR DC COGENERATOR SYSTEMS

This application is a continuation-in-part of application Ser. No. 08/606,219, now U.S. Pat. No. 5,786,642, dated Jul. 28, 1998, filed Mar. 7, 1996, which is a continuation-in-part of application Ser. No. 08/328,574, filed Oct. 24, 1994, now U.S. Pat. No. 5,500,561 dated Mar. 19, 1996, which was a continuation of application Ser. No. 08/129,375, filed Sep. 30, 1993, now U.S. Pat. No. 5,363,333 dated Nov. 8, 1994, which is a continuation of application Ser. No. 07/944,796, filed Sep. 14, 1992, now abandoned which is a continuation of application Ser. No. 07/638,637, filed Jan. 8, 1991, now abandoned.

BACKGROUND OF THE INVENTION

The present invention relates to improved cogeneration systems.

Cogeneration systems are capable of producing useful electrical and thermal energy output from a variety of fuel sources. By utilizing both types energy outputs, such systems characteristically achieve higher fuel efficiency. Currently small cogeneration systems are not cost effective because they tend to be capital intensive relative to the energy saving achieved. Their poor economy is a result of conventional system practice that attempts to size these units for peak capacity requirements, resulting in poor capacity factor relative to the load served. In summary, they would prove more cost effective if they could be sized for average electric and thermal power needs.

OBJECTS OF THE INVENTION

An object of the present invention is to permit hardware downsizing while maintaining or improving service thereby enhancing pay-back value.

A further object is to add more application flexibility by permitting the use of more than one power source. For example, public utility grid power, cogenerated power or on-site photovoltaic power can be used together without expensive power conditioning.

Another object is to reduce the control complexity of the cogenerator system.

Yet another object of this invention is to render the cogenerator to be sized for the average power needs for up to a 5 to 1 reduction in effective generator sizing as compared to peak power sizing. Standby losses are reduced thereby contributing to higher electrical efficiency which also contributes to further downsizing. In this way, the present invention contributes to the practicality of smaller sized cogenerators which broadens the range of applicability to single family housing and other smaller building spaces.

Another object of this invention is to create practical small cogeneration systems based on the use of internal combustion engine driven generators, fuel cell generation of electricity and heat, and thermophotovoltaic (TPV) cogeneration systems.

Another object of this invention is the configuration of an emergency power source for single family housing use with exceptional quietness, fuel efficiency and small size.

SUMMARY OF THE INVENTION

In keeping with theses objects and others which may become apparent the power sharing modular DC cogeneration system of the present invention includes a DC power system capable of receiving AC electrical power and DC electrical power from separate first and second sources simultaneously. The DC power system delivers DC electrical power to an output for use by a load requiring DC power.

The DC power system includes a converter to convert AC electrical power to DC electrical power and a power sharing control means to control and distribute the DC electrical power to an output.

The first source of DC electrical power includes a storage battery, which provides standby DC electrical power to the DC power system. It also includes a power sharing means, which maintains the storage battery fully charged for use at peak loads, when the DC output electrical power is insufficient to meet the DC load.

The second source of DC electrical power is a cogenerator such as a fuel cell, a thermophotovoltaic generator or an internal combustion engine and an alternator for generating and delivering DC electrical power to the power sharing means, while producing and delivering waste heat for use of an external load requiring this heat.

BRIEF DESCRIPTION OF THE DRAWINGS

The present invention can best be understood in conjunction with the accompanying drawings, in which.

DETAILED DESCRIPTION OF THE INVENTION

Figure 1:
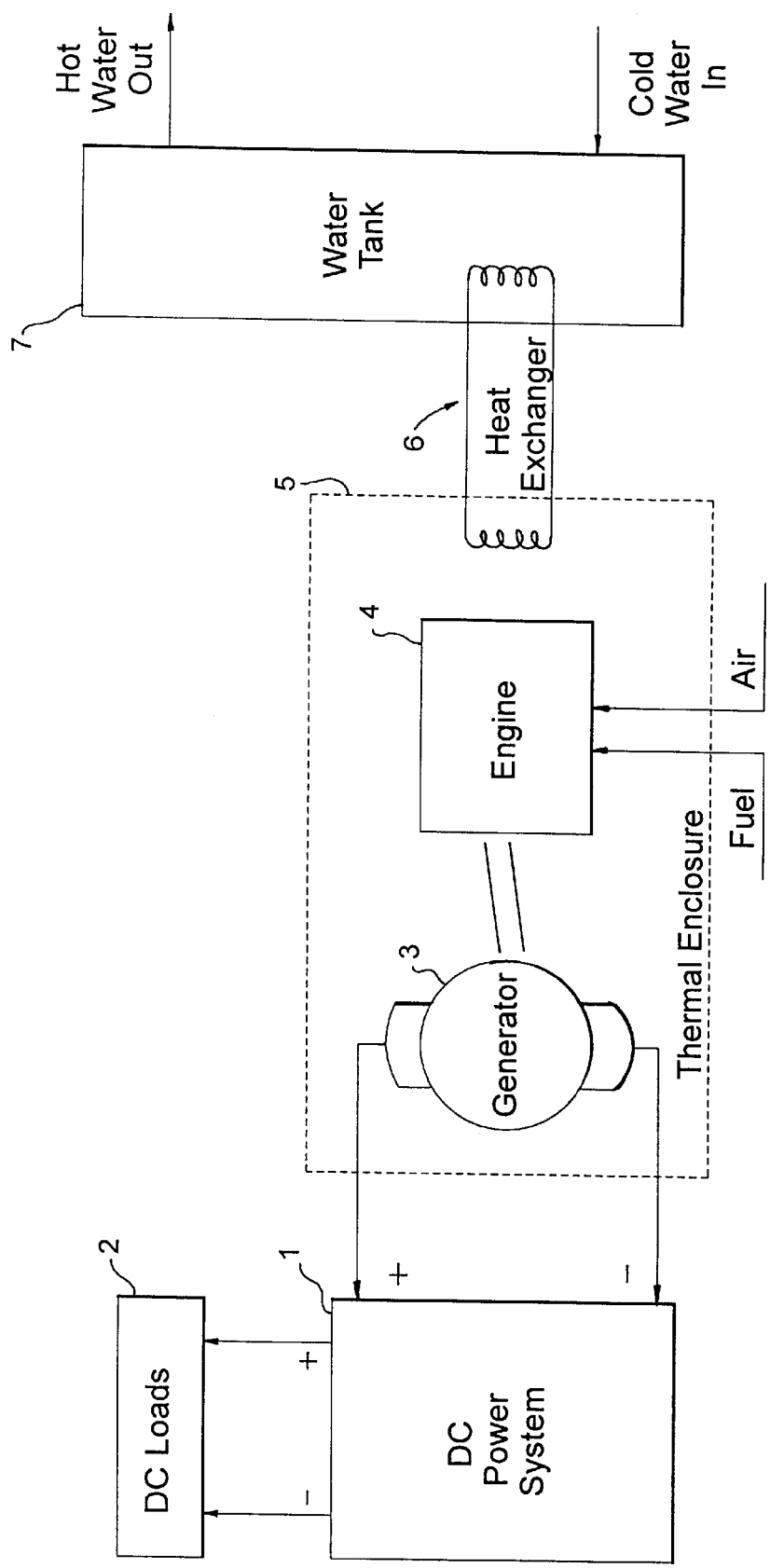
FIG. 1 is a block diagram of an engine driven cogeneration system.

FIG. 1 shows a cogeneration system using an engine driven generator. As opposed to the well established large capacity natural gas or liquid fueled diesel engine or gas turbine driven cogeneration systems, the present invention depicts a system sized for a typical household. Although the engine 4 may be an external combustion Stirling engine, a more typical type would be an internal combustion engine using a diesel cycle or spark ignition. Engine 4 drives a DC generator 3 or an alternator with built-in rectifying diodes, such as is common practice in automotive applications to convert the generated AC to DC right at the source. One or more thermal enclosures 5 capture the heat from the exhaust and cooling jacket of the engine and couple it to a heat exchanger 6, which can convey the thermal energy to do useful work. In some configurations, even the heat of the generator 3 is captured.

In the illustration of FIG. 1, the heat exchanger 6 is a liquid-to-liquid type which is used to heat domestic water in tank 7. Other uses might be space heating or cooling via a heat driven absorption air conditioner. The DC electrical energy from generator 3 is input to the DC power system module 1, which then powers the DC loads. Some examples of household DC loads that are presently available include lighting using DC electronic fluorescent ballasts, water pumps, refrigerators and freezers, entertainment equipment, personal computers, electric ranges and microwave ovens.

Figure 4:
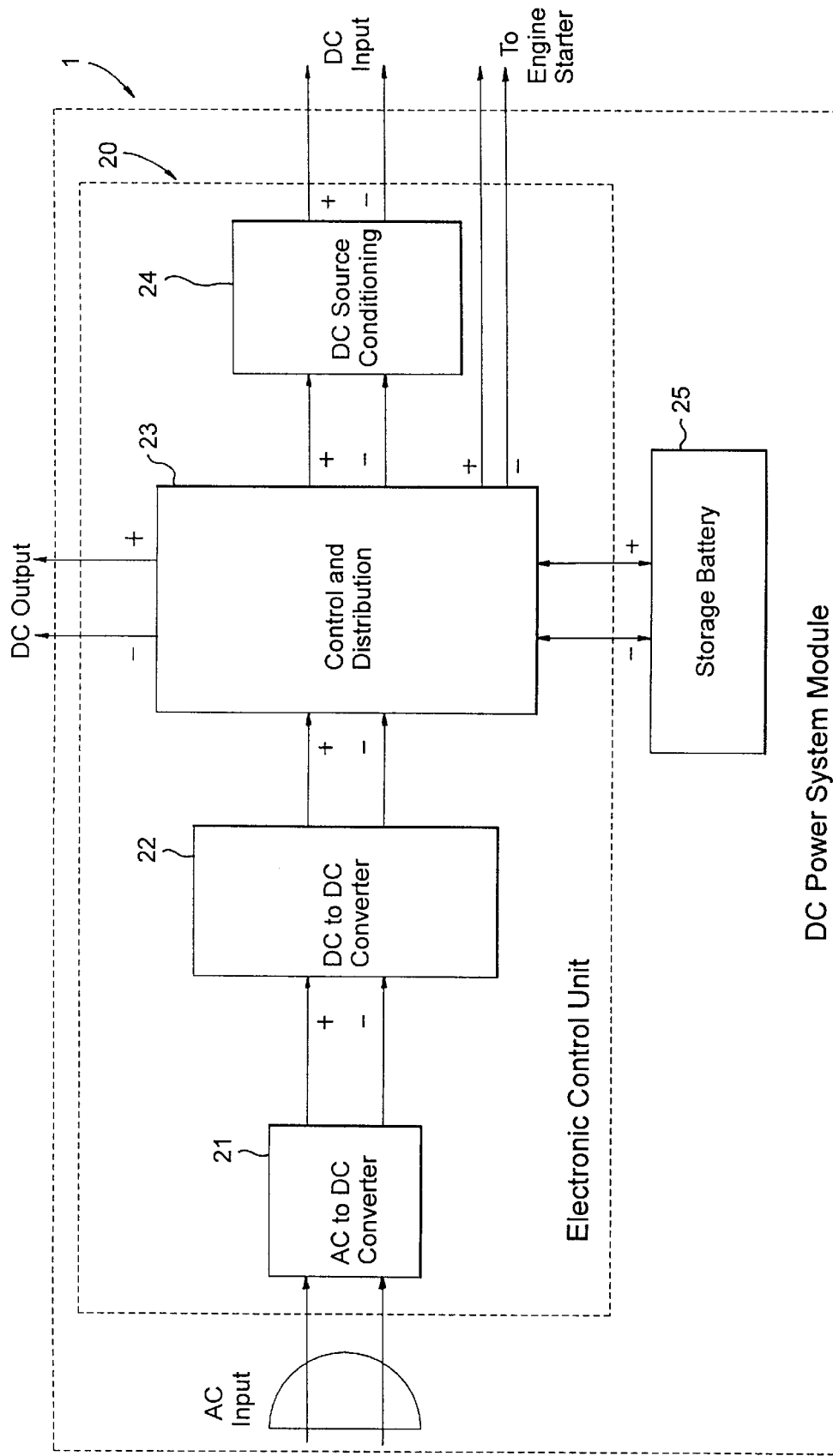
FIG. 4 is a block diagram of DC Power System Module.

FIG. 4 shows a block diagram of DC power system module 1. This includes an AC grid connected input, a storage battery 25 and a DC Electronic Control Unit 20.

Power sharing is accomplished via three major sources, grid supplied AC power, storage battery 25 and DC power input (which in this case is an engine driven DC generator 3). The grid supplied AC power is converted to DC power in block 21 which typically contains a bridge rectifier and filter capacitor. This is fed to a DC to DC converter 22 which is of a high efficiency switching mode topology with typical frequencies of 20 to 500 kHz to reduce the voltage to a nominal 26 volts DC, which is managed by the control and distribution block 23. The external DC input is conditioned by block 24 which includes transient suppression and is then input to block 23.

The storage battery 25 is either charged (using grid supplied AC or external DC input as a power source) by block 23 or it feeds power to block 23 as needed. In a cogeneration mode with the grid power not in use, the external DC input (i.e., the DC generator 3) supplies average power to the load at the DC output terminals, but if the load exceeds the capability of this source during a peak demand, block 23 will draw the required current from battery 25 to make up the deficit. The battery 25 is then recharged during low demand periods.

The features and advantages of the present invention compensate for the most significant limitations of previous embodiments of engine driven cogenerators.

First, the high or higher efficiency DC loads reduce the magnitude of the electrical load requirements.

Second, the managed storage (i.e. the battery) eliminates the need to over-size the cogenerator to meet the demand peaks (such as motor starting), since such batteries are capable of delivering very high peak currents. This has the very positive effect of reducing both the size of the engine and generator section of the cogenerator while still supporting the effective load requirements of a given application. Similarly, the increased system duty cycle on-time influenced by the present invention significantly reduces the number of starts and stops normally associated with the requirements of small scale systems. This improves the reliability of the engine subsystem and increases its effectiveness.

Further, the smaller hardware size permitted by the present invention affords greater packaging flexibility; this is a factor advancing modularity for lower production cost and easier and less costly installation.

If rendered more cost effective, fuel cells offer an attractive balance of electric and thermal generation. First introduced in the 1950's, the fuel cell is capable of uniquely high electrical conversion efficiencies (40% to 50%) over a wide range of load conditions. It is capable of converting the energy of fuel after reforming (to free the hydrogen bond from its molecular hydrocarbon bonds) directly into electrical energy. Thus, the usual steps and losses involved in conversion of fuel into heat and subsequently into mechanical energy and finally electrical energy are avoided.

Fuel cells are not Carnot-cycle limited. First generation fuel cells using phosphoric acid electrolyte (the most developed) operate with cell temperatures of 205 degrees C. (400 degrees F.) suitable for all domestic applications. It is possible to use them with a broad range of liquid and gaseous fuels, including coal derived gasses.

Fuel cells have the ability to convert domestic fuels with negligible environmental impact. Air emissions for key pollutants ($SO_2$, $NO_2$, and particulates) range from negligible to undetectable with gas or distillate fuels. Because of their high total energy conversion efficiency in cogeneration applications (80 to 85%), fuel cells produce lower levels of greenhouse gas pollutants such as carbon dioxide. The fuel processor, or reformer, supplies fuel of the proper composition and purity to the fuel cell stack, consequently transforming a hydrocarbon fuel into hydrogen and fuel byproducts. On going research to develop high-temperature fuel cells facilitate the reforming reaction to take place in the anode, thus eliminating the need for a separate fuel processor.

Figure 2:
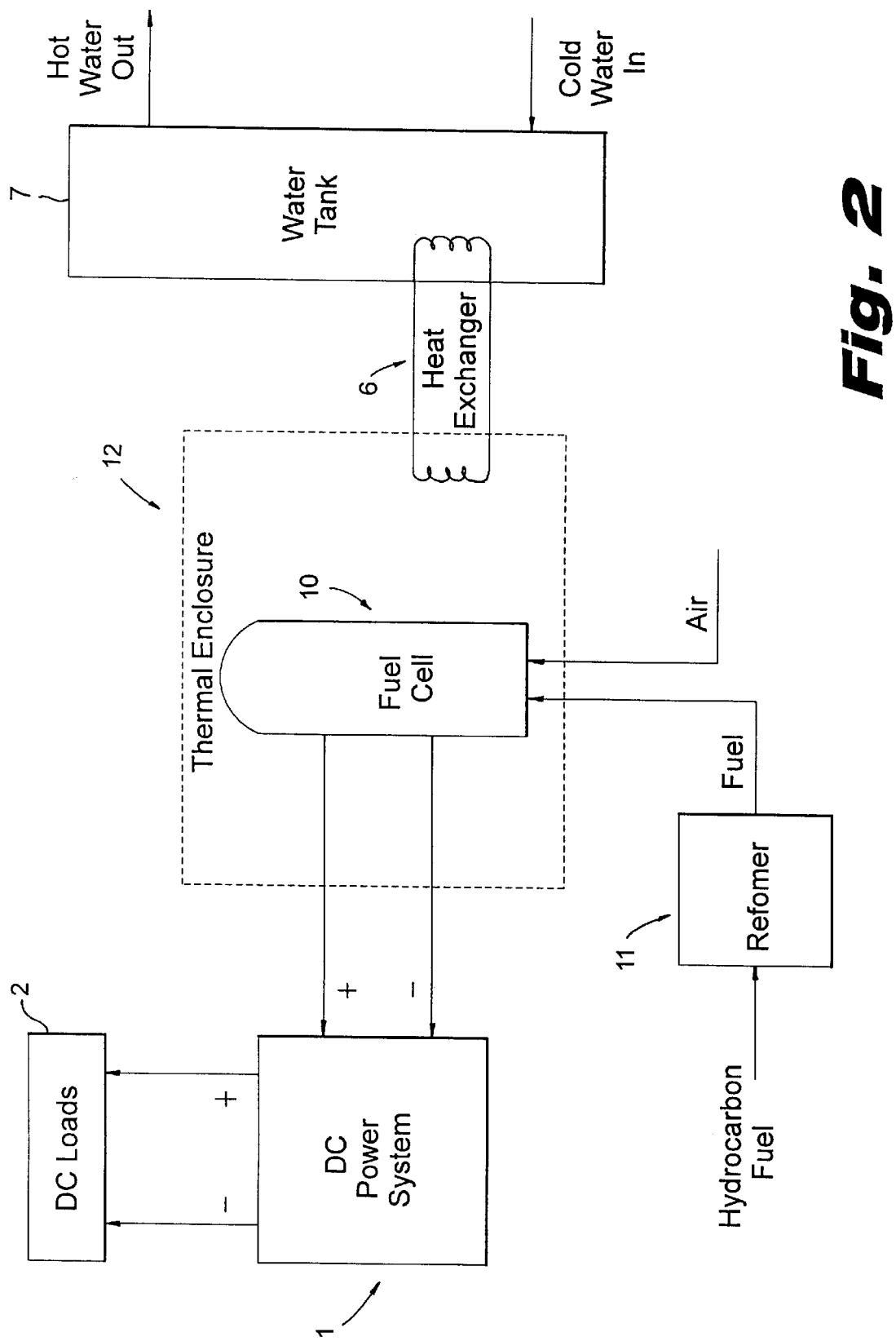
FIG. 2 is a block diagram of a fuel cell driven cogeneration system.

FIG. 2 shows the block diagram of a fuel cell cogeneration system of this invention. Hydrocarbon fuel is preprocessed in reformer 11 and fed with air (the oxygen source) to fuel cell 10. Thermal enclosure 12 couples the thermal energy generated with heat exchanger 6 which is shown in this illustration as heating water in tank 7.

The electrical output of the fuel cell is connected to the DC power system module 1 which is essentially as described above for the engine driven example. Therefore, power sharing between grid supplied AC power, storage battery power supplying peak loads, and fuel cell supplied DC power is controlled to supply DC loads 2.

Although fuel cells are capable of fast electrical load response and do maintain efficient operation under part load, the main advantages of this configuration are the downsizing of the fuel cell, the efficient DC loads further supporting down-sizing and the elimination of the need for a power inverter to convert the intrinsic DC fuel cell output to AC for more typical AC loads. This down-sizing significantly reduces capital intensity of the installation since a limited amount of battery storage is a very cost effective alternative. Thus a cogeneration system for a household (or a modular package to provide part of a larger load) can be configured with no major moving parts to wear out or produce noise.

In the thermophotovoltaic (TPV) generator, combustion energy can be converted, with the proper emitter, into nearly monochromatic light and into heat. The light is converted into DC electric power with a photovoltaic collector at much higher efficiency than is possible, for example, with a broadband source like the sun.

The concept suggests a relatively straightforward way of deriving both electricity and high quality thermal energy from a single system and fuel source. Like the fuel cell, it also promises to have few, if any, moving parts.

The system combustor operates through a light producing fiber matrix emitter exposed to the mixture of fuel gas and air. At the outer surface both luminous energy and convective heat are simultaneously produced. The fiber matrix emitter is held in proximity to a photovoltaic (PV) cell array such that optimal radiant energy is collected.

Promising new developments suggest that radiant fluxes greater than one equivalent sun with a narrow optical bandwidth equivalent to, or slightly greater than, the bandgap of the photovoltaic (PV) collector is achievable. This suggests photovoltaic (PV) energy collecting economies are much more attractive than the current cost of $5 per watt. Research and development work at the Quantum Group in San Diego, Calif. suggests that it is possible to derive many equivalent suns of luminous energy from such a device with a practical fiber matrix emitter. This would significantly enhance lumen-to-power efficiency.

Not all of the characteristics of the thermophotovoltaics (TPV) are attractive, however. One limitation is that the ability to modulate or throttle the electrical output is lacking. With a narrow range of efficient operation, it must be operated in either an ON or OFF condition, rendering it ineffective under part load conditions.

Figure 3:
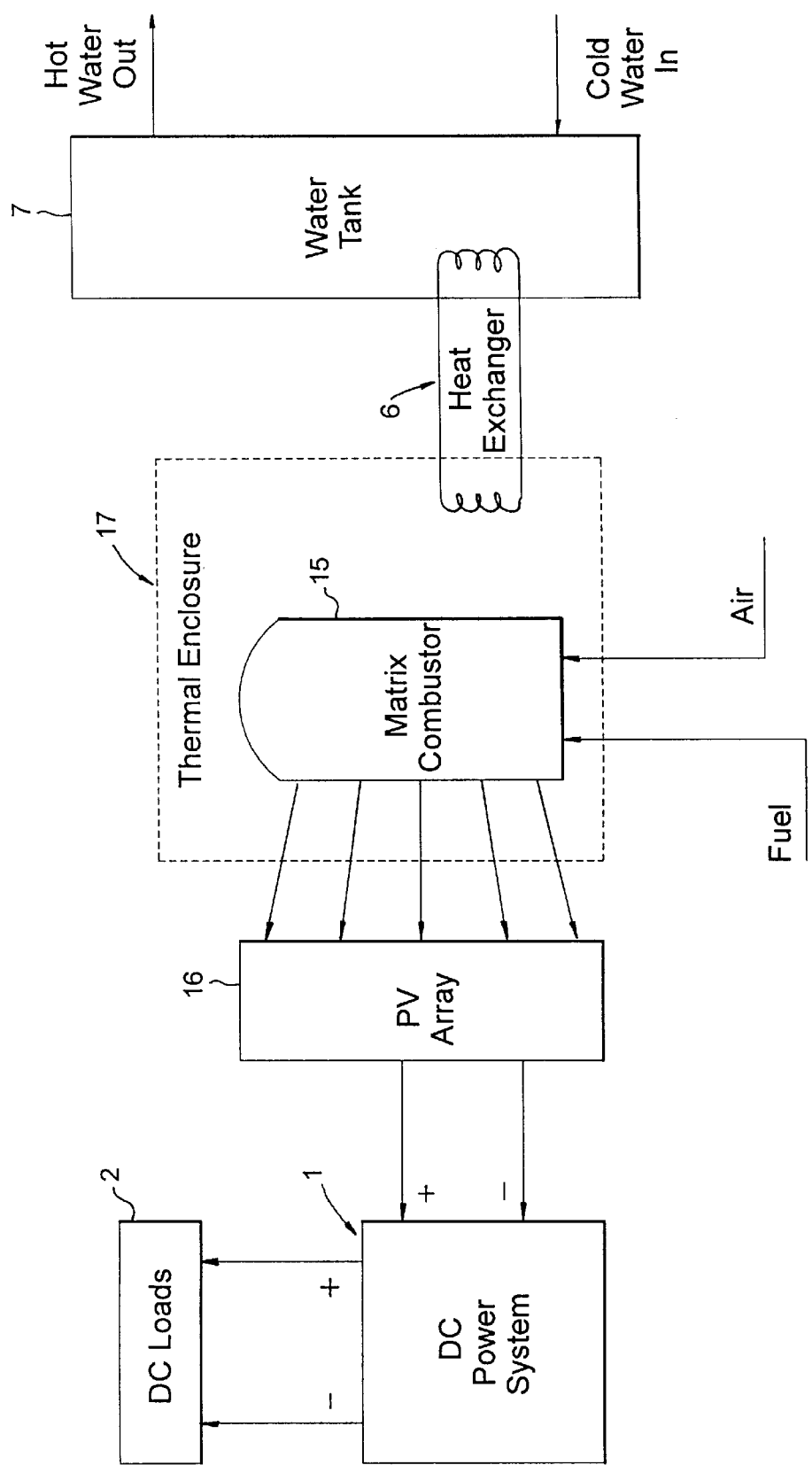
FIG. 3 is a block diagram of a thermophotovoltaic (TPV) driven cogeneration system.

Still another limitation of the current state of the art is the low electrical fuel efficiency of thermophotovoltaic (TPV) generator. However, a practical embodiment of a thermophotovoltaic (TPV) cogeneration system is shown in FIG. 3. The matrix/combustor 15 is fed fuel and air. The luminous radiant energy is converted to DC electrical power by the photovoltaic (PV) array 16. A thermal enclosure 17 couples the thermal load via heat exchanger 6 with the illustrated water heated application of tank 7. The photovoltaic (PV) electricity generated is coupled to DC power system module 1 for load sharing with grid supplied AC and peak demand supplied by a storage battery. The DC output is fed to DC loads 2.

In this embodiment, the thermophotovoltaic (TPV) generator is made practical because it can be sized for the average power requirements permitting it to function in the steady-state mode. The other efficiency factors mentioned for other cogeneration sources above also apply thereby contributing major cost reductions by further down-sizing the thermophotovolaic (TPV) unit.

Figure 5:
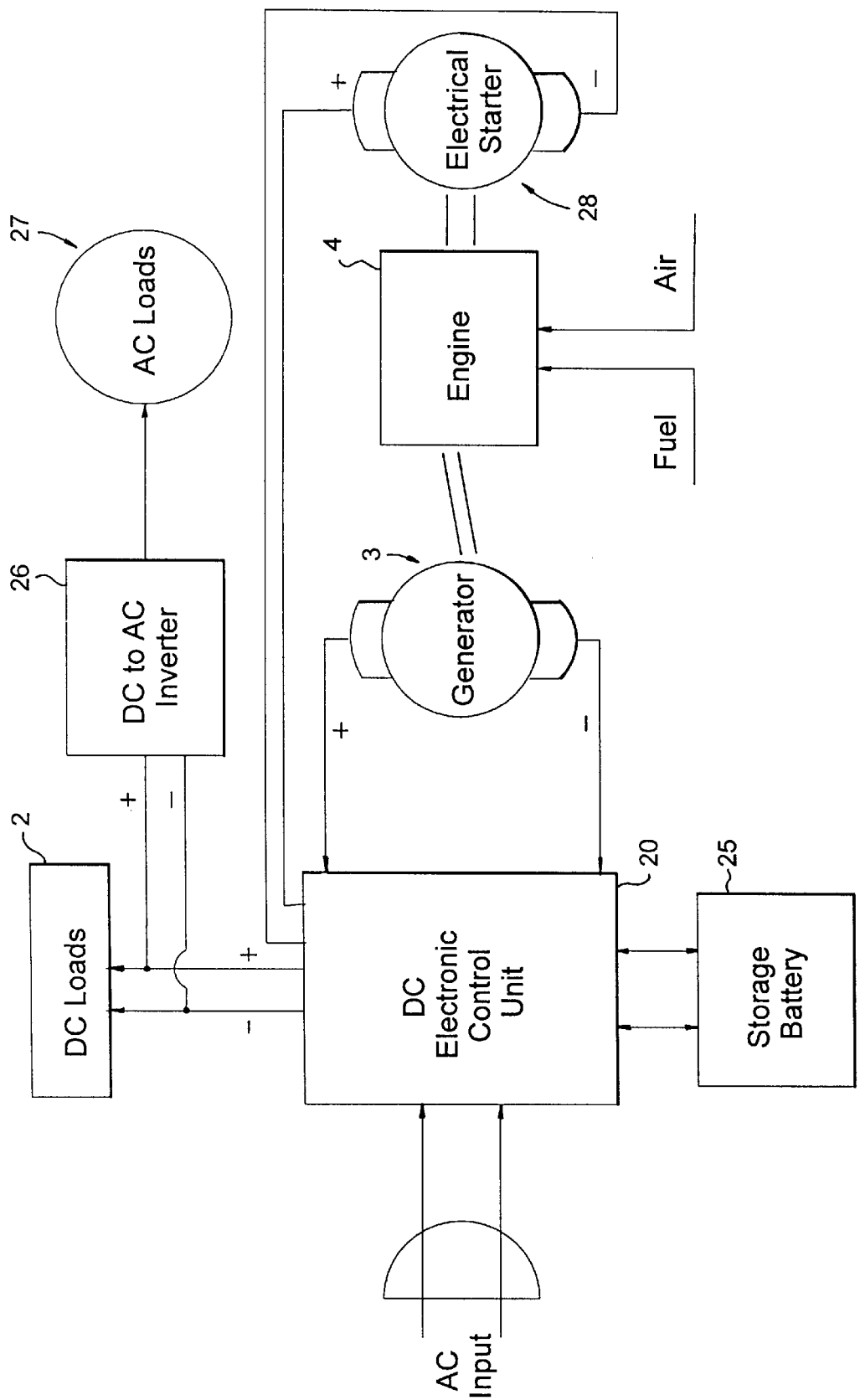
FIG. 5 is a block diagram of small emergency power source.

FIG. 5 shows a configuration for a small emergency power generator for typical household use. A small gasoline engine 4 drives a DC generator 3 (or alternator with integral diodes) which is electrically coupled to the DC electronic control unit 20 previously described. A storage battery 25 is used to supply demand peaks so that the generator 3 and engine 4 are sized for average power demand.

Since a typical present day household may not have any DC loads 2, a DC to AC inverter 26 is included to supply typical household AC loads 27. An inverter 26 can be designed to handle large overloads or peaks at little additional cost; it is therefore capable of this peak load as supplied by peak power from the storage battery through control block 20. Such an emergency system can be stored much like the presently available units for the same purpose, and it can then be retrieved and started as needed.

The main advantages of this embodiment is that the battery supplied peak capability permits the use of a much smaller engine/generator combination to operate a larger portion (or all) of the appliances and lights of an entire household. Size, weight and noise are reduced while efficiency (i.e., low fuel use) is greatly enhanced.

Besides usability as an emergency back-up source, this same system as configured in FIG. 5 can be integrated as an uninterruptable power system with a continuous utility connection. The grid connected AC power keeps the battery charged and ready for uninterruptable back-up should there be a power outage. If the outage lasts past a predetermined period, or alternatively if the battery charge should fall below a predetermined level, an electrical starter 28 on engine 4 is automatically engaged to start it, thereby operating the emergency generator 3.

Other modifications may be made to the present invention without departing from the scope of the invention, as noted in the appended claims.

I claim:

1. A power sharing modular DC cogeneration system comprising:

DC power system means capable of receiving AC electrical power and DC electrical power from first and second sources simultaneously and delivering DC electrical power to an output for use by a load requiring DC power;

said DC power system means comprising both means for converting said AC electrical power to DC electrical power and power sharing means for controlling and distributing said DC electrical power to said output;

the first source of DC electrical power comprising storage battery means for providing standby DC electrical power to said DC power system means, said power sharing means maintaining said storage battery fully charged for use at peak loads when the DC output electrical power is insufficient to meet the DC load; and the second source of DC electrical power being cogeneration means for generating and delivering DC electrical power to said power sharing means while producing and delivering waste heat for use of an external load requiring said heat.

2. The power sharing modular DC cogeneration system of claim 1 in which said cogeneration means comprises a combustion engine and an alternator.

3. The power sharing modular DC cogeneration system of claim 1 in which said cogeneration means comprises a fuel cell.

4. The power sharing modular DC cogeneration system of claim 1 in which said cogeneration means comprises a thermo photovoltaic generator.

5. An emergency power system comprising:

DC electrical control means for receiving, singly and together, a source of AC electrical power and least one low voltage DC power source; said DC electrical control means capable of receiving DC electrical power from first and second sources simultaneously and delivering DC electrical power to an output for use by a load requiring DC power;

said DC power system means converting said AC electrical power to DC electrical power and controlling and distributing said DC electrical power to said output;

said first source of DC electrical power comprising storage battery means for providing standby DC electrical power to said DC power system means, said DC power system maintaining said storage battery fully charged for use at peak loads when the DC output electrical power is insufficient to meet the DC load; and said second source of DC electrical power being cogeneration means for generating and delivering DC electrical power to said DC power system when there is an AC power outage, said cogeneration means producing and delivering waste heat for use of an external load requiring said heat.

6. The emergency power system of claim 5 in which said cogeneration means remains inoperative on a standby basis and includes means for automatically being started when any AC power outage lasts past a predetermined time or if the charge in said battery means should drop below a predetermined level.

7. The emergency power system of claim 6 in which said cogeneration means comprises an internal combustion engine.

8. A power sharing modular low voltage DC cogeneration system comprising:

a DC subsystem device responsive to receiving, singly and together, a source of AC power and at least one low voltage DC power source;

said DC subsystem device comprising multiple functions for converting said AC electrical power into low voltage DC electrical power and combining and sharing said power with one or more external low voltage DC power sources in service to a compatible low voltage DC load.

9. An emergency power system comprising:

DC power system means capable of receiving AC electrical power and converting said AC electrical power to supply power to charge, and keep charged, a low voltage storage battery;

said DC power system means also capable of receiving DC power from a DC generator means;

said DC power system means supplying DC power to an inverter which supplies connected AC loads during an AC power outage; and, said DC generator means being sized to supply only average AC loads with a small margin to keep said storage battery charged, wherein peak AC loads are supplied by said storage battery.

10. The power sharing modular DC cogeneration system of claim 9 in which said cogeneration means comprises a combustion engine and an alternator.

11. The power sharing modular DC cogeneration system of claim 9 in which said cogeneration means comprises a fuel cell.

12. The power sharing modular DC cogeneration system of claim 9 in which said cogeneration means comprises a thermo photovoltaic generator.

13. The emergency power system of claim 9 in which said generation means remains inoperative on a standby basis and includes means for automatically being started when any AC power outage lasts past a predetermined time or if the charge in said battery means should drop below a predetermined level.

14. The emergency power system of claim 9 in which said generation means comprises an internal combustion engine.

* * * * *